Nov. 20, 1934.  A. W. HERRINGTON  1,981,173
DRIVING MECHANISM FOR STEERING WHEELS OF MOTOR VEHICLES
Filed May 15, 1930   3 Sheets-Sheet 1

Inventor
A.W. Herrington,
By Robt. E. Barry
Attorney

Nov. 20, 1934.   A. W. HERRINGTON   1,981,173
DRIVING MECHANISM FOR STEERING WHEELS OF MOTOR VEHICLES
Filed May 15, 1930   3 Sheets-Sheet 2
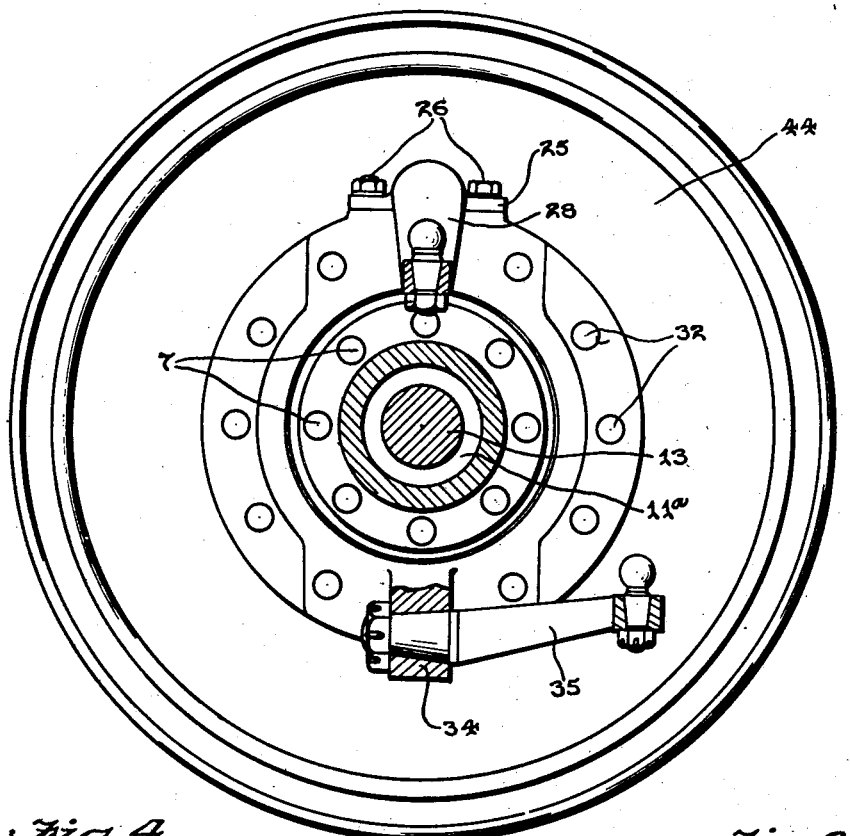
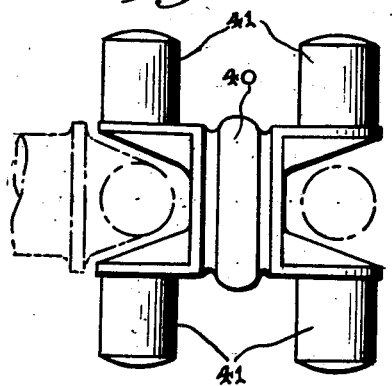
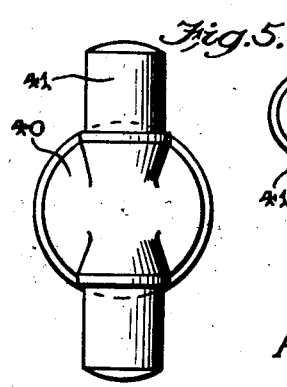
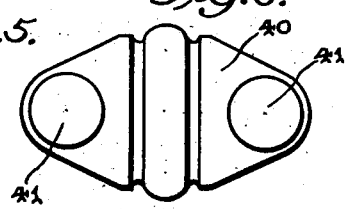
Inventor
A. W. Herrington,
By Robt. E. Barry
Attorney

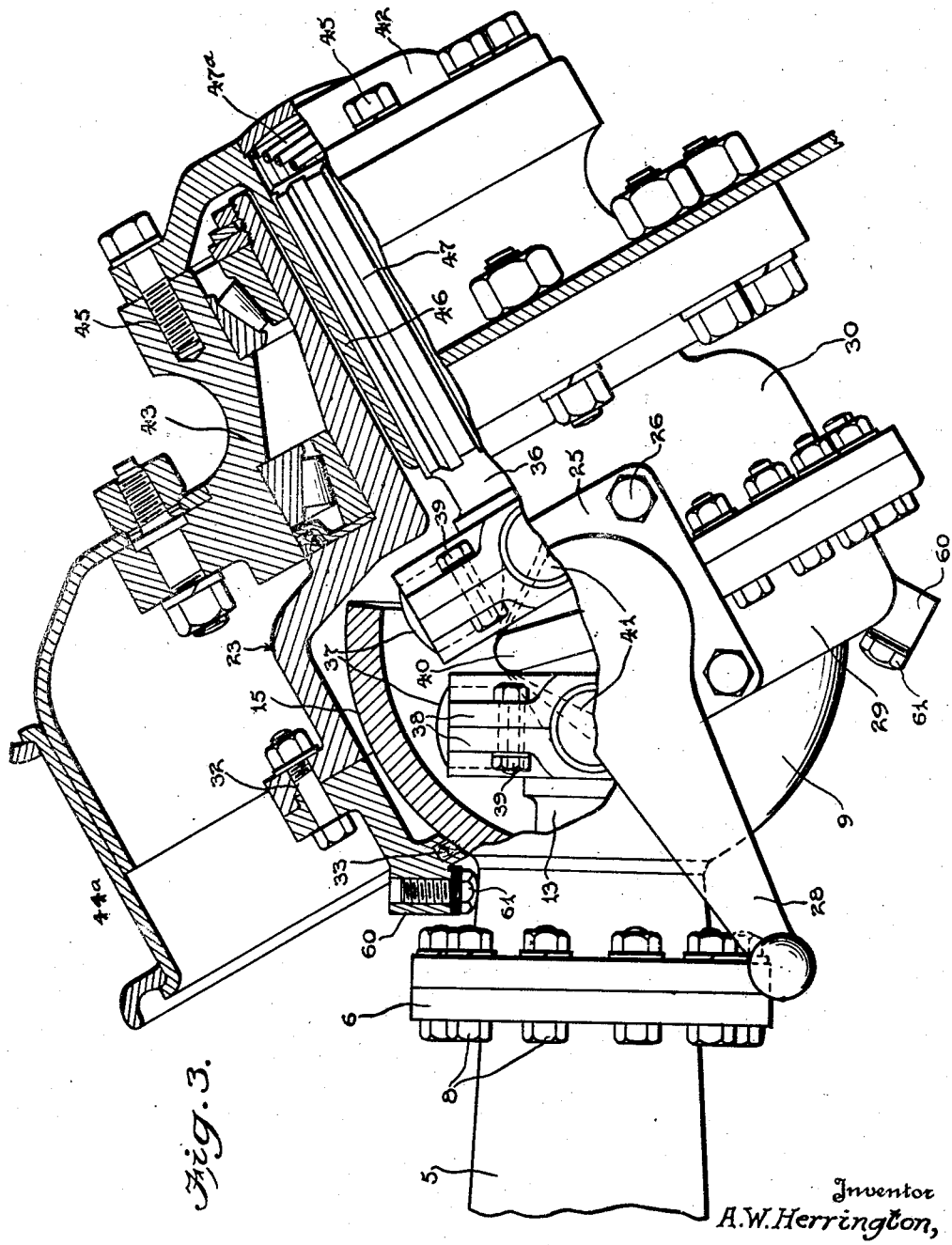

Patented Nov. 20, 1934

1,981,173

UNITED STATES PATENT OFFICE 1,981,173

DRIVING MECHANISM FOR STEERING WHEELS OF MOTOR VEHICLES

Arthur W. Herrington, Washington, D. C.

Application May 15, 1930, Serial No. 452,689

5 Claims. (Cl. 180—43)

This invention relates to front wheel drive mechanism for automobiles, and more particularly to novel means for driving the steering wheels of heavy motor trucks.

The primary object of the invention is to provide a practical mechanism of this character, of rugged construction, the parts of which may be easily assembled or dismantled.

Another object is to furnish such a construction in which most of the elements are interchangeable for the right and left wheels to eliminate the necessity of machining two sets of parts for the opposite wheels.

A further object is to provide mechanism of this sort, in which the steering axle is given utmost support to take care of the side thrust resulting from the wheels operating when positioned at an angle from the plane of normal operation.

A further object is to furnish improved means for housing the universal joints forming part of the mechanism; this means requiring only a single oil seal to prevent grease from working its way out, and to prevent dirt, grit or the like from entering the joints and bearings.

Another object is to provide an improved combination of elements for adjusting the pivot bearing of the mechanism which eliminates the placing of the weight of the vehicle upon screw threads or the like, ordinarily employed for such adjustment.

A still further object is to connect the universal joints to the driving shaft by a strong quick detachable joint, whereby in case of breakage of the shaft, that element may be replaced without discarding the joints.

A further object is to furnish a construction of this character, wherein the universal joint is of the constant velocity type, in which the periphery of the wheel revolves at the same relative speed as the driving axle shaft, regardless of the angle which the wheel assumes in service.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 2 is an elevation partly in vertical section, of the mechanism, viewed from the inner side of the wheel.

Fig. 3 is a top plan view of the mechanism, partly in horizontal section, and showing the wheel at an angle to the driving shaft.

Figs. 4, 5 and 6 are respectively, a side elevation, end view and top plan view of the medial element of the universal joints.

Figure 1:
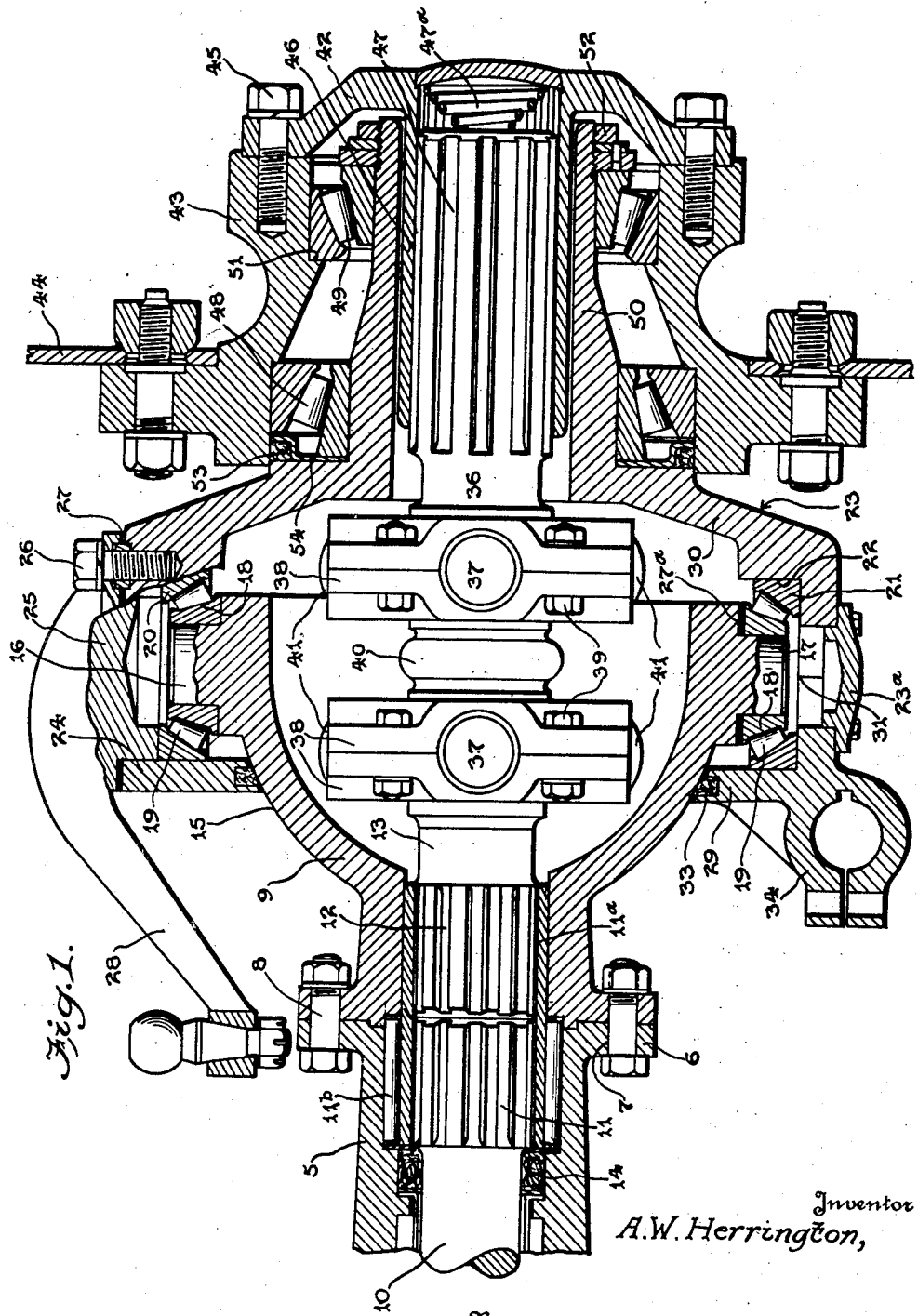
Fig. 1 is a transverse vertical sectional view of a portion of the front drive shaft of a motor vehicle, and a conventional steering wheel with my improved mechanism interposed between the same.

In the drawings, 5 designates a portion of a cast metal front drive shaft housing of a motor vehicle provided at its outer end with a flange 6 having a number of apertures 7 to receive bolts 8 that are employed to rigidly and detachably connect a ball housing 9 to the end of the housing.

A front drive shaft 10 extends through the housing and is interlocked at its outer end by means of a toothed spline 11 with a coupling sleeve 11a which is similarly connected to the inwardly extending shank 12 of one of the end members 13 of the universal joints.

The sleeve 11a rotates in a roller bearing 11b.

A conventional felt seal 14, surrounds the shaft, and prevents grease from working its way along the shaft.

The ball housing has a parti-spherical outer surface 15, from which projects diametrically opposite vertical trunnions 16 and 17, each provided with a detachable bearing race 18. The outer surfaces of these races are of frusto-conical shape, tapering toward their outer ends, and they cooperate with frusto-conical rollers 19 that engage stationary race rings 20 and 21, to provide combined radial and thrust bearings.

It will be noted at this point that the ring 21 is positioned in a cylindrical socket 22, located within the housing 23 of the mechanism, and having an opening in its bottom closed by a removable plug 23a. Due to this construction, the weight of the vehicle is transmitted at this point to the housing, without the necessity of using screw threads or the like for adjustment purposes, which threads would be liable to shear under the heavy loads to which trucks are subjected.

At a point directly above the socket 22, the housing has a sleeve or hollow boss 24, in which the race ring 20 is arranged, and for adjustment purposes, a cap 25 has a reduced lower end which extends into the boss and bears upon the ring. This cap is retained in position by screws or bolts 26; and shims 27 are positioned between the edge portion of the cap and the outer end of the boss, as well as between an annular shoulder 27a of the ball housing and the ring 18. Obviously, when it is necessary to take up wear, one or more of the shims may be removed, and then the bolts or screws 26 can be tightened so as to force the ring 20 downwardly.

On the side of the vehicle where the steering knuckle is located, the cap 25 is provided with an arm 28 for connection to the conventional steering mechanism.

The housing 23 is preferably forged, and consists of an inner member 29, and an outer member 30, which contact along a substantially annular stepped surface 31, and are secured together by bolts or screws which extend through apertures 32 in the same.

The bearing pocket 22 and the aligned bore for the bearing race 20, it will be observed, are of the same diameter and they are formed by first fitting the two parts of the female housing together and then machining the same in such manner that the bottom of the pocket 22 will be accurately positioned relatively to the axis of the pocket, and the two bores will be accurately aligned.

It will be noted at this point that the housing and its connected parts are so constructed that only a single oil seal 33 is necessary to prevent grease from discharging, or dirt or grit from entering. This seal which is carried by the housing, is of annular form and bears upon the spherical surface 15 of the ball housing, so that the seal will contact with said surface, regardless of the position of the wheel.

The inner member of the housing is equipped with a depending integral apertured lug 34 for connection to the arm 35 which is used in joining the opposite housings to the link, not shown, that connects such housings for unitary movement.

A stub axle 36, as well as the stub axle 13, has diametrically opposite horizontal trunnions 37 which are swiveled in notched coupling plates 38. Each pair of these plates are secured together by bolts 39. A medial member 40, (Figs. 4, 5 and 6), of the pair of universal joints, is provided at its ends with upwardly and downwardly extending inner and outer pins 41 which are also swiveled in the coupling plates, but arranged at 90 degrees relatively to the trunnions 37. Due to the rigid connection of the pins 41 by the medial member 40, the axes of the inner and outer pins 41 of the universal joints always remain a certain definite distance apart.

A hub cap 42 is connected to the hub 43 of the steering wheel 44 by any suitable means, such as screws 45, and the cap has an elongated inwardly extending sleeve 46 which is slidably joined to the stub shaft by a toothed spline 47, and thus furnishes utmost support for that shaft to take care of side thrusts resulting from the wheel operating when in a plane at an angle to the normal plane of operation. A coiled spring 47a, which bears at one end against the cap, and at its other end against the stub shaft 36, acts to force said shaft toward the universal joints. The wheel 44 has a rim 44a which surrounds the housing in the plane of the axes of the vertical trunnions 16 and 17.

Suitable anti-friction thrust bearings 48 and 49 are mounted on an outwardly extending sleeve 50 which is integral with the housing and surrounds the sleeve 46, and on these bearings, the hub of the wheel is mounted. For the purpose of retaining the wheel in place, the outer bearing 49 engages an internal annular shoulder 51 of the hub, and in turn this bearing is held in place by a nut assembly 52 which is threaded to the outer end of the sleeve 50.

A grease seal 53 is provided between the inner end of the hub and an annular shoulder 54 of the housing 23 to retain the grease about the bearings 48 and 49, and prevent dirt or the like from entering said bearings.

It will be observed that my construction is such that the hub of the wheel is positioned at one side of the axis of the trunnions 16 and 17, while that axis is in the plane of the wheel, (see Fig. 3).

In operation, it will be understood that the shaft 10 drives the medial member 40 of the universal joints, and that the latter, through the medium of the outer coupling plates 38, rotates the trunnions 37 of the stub axle 36. The latter drives the sleeve 46 which is integral with the cap 42, and the cap, by means of the screws 45, rotates the steering wheel. Of course, the motion is transmitted in this way, whether the plane of the wheel is parallel to the longitudinal axis of the vehicle, or at an angle to such axis, and regardless of the location of the plane of the steering wheel. The universal joints may be classified as a constant velocity joint, as the periphery of the wheel will revolve at the same relative speed as the driving axle shaft 10, regardless of the angle to which the wheel is placed in service.

One of the fundamental requirements in the structure is that the constant-velocity universal joint device must be so positioned relatively to the axis of the trunnions 16, 17, about which the steering wheel is to swing that, throughout the range of swing of the steering wheel spindle, the joint will be uniformly effective in transmitting to the wheel, the same velocities which are transmitted to the joint.

I prefer to make the parts 5 and 43 as castings, and to forge the parts 9, 29 and 30.

Lugs 60 are arranged at opposite sides of the housing section 29 and have screw threaded openings to receive adjustable stop screws 61 which limit the turning movement of the wheel so that it does not at any time exceed the capacity of the universal joints. In the embodiment illustrated, I have used a pair of joints capable of swinging 35°, whereas the stops limit the swinging of the wheel at 30°. When the wheel swings to the limit of its travel, the stops abut against the axle housing.

It will be noted that in a structure of the character described, it is essential to hold the overall dimensions of the mechanism within the requirements of traffic laws without sacrifice of strength.

To facilitate dismantling in case the axle 10 should be broken, it may be seen that the spline connection provided by the sleeve 11a permits the shaft 10, the universal joints, and sleeve to be detached from the housing 5 as a unit after the bolts 8 are removed.

Those skilled in the art will readily understand that a construction of this character may be readily assembled or dismantled to facilitate repairs or replacement of parts, and as the mechanism is relatively large in comparison with the diameter of the wheel, it is manifest that the mechanism will withstand great strains, and carry heavy loads, without breakage of the parts.

While I have disclosed what I now consider to be a preferred embodiment of the invention in such manner that the construction, operation and advantages of the invention may be readily understood by those conversant with mechanism of this kind, I am aware that changes may be made in the details disclosed, without departing from the spirit of the invention, as expressed in the claims.

What I claim and desire to secure by Letters Patent is:

1. In a mechanism of the character described, a stationary housing having a hollow ball-shaped portion provided with diametrically opposite upwardly and downwardly projecting trunnions, a movable housing having a lower socket and an upper hollow boss into which said trunnions extend, said socket having a stationary seat arranged perpendicularly to the axes of the trunnions, an anti-friction thrust bearing permanently resting on said seat and interposed between said socket and the lower trunnion, an anti-friction thrust bearing interposed between said boss and the upper trunnion, a cap detachably secured to the housing and bearing upon the upper anti-friction bearing, and shims arranged between the boss and said cap to permit adjustment of the bearings to take up wear.

2. In a mechanism of the character described, a stationary housing having a hollow ball-shaped portion provided with diametrically opposite upwardly and downwardly projecting trunnions, a movable housing having a lower socket and an upper hollow boss into which said trunnions extend, said socket having a stationary seat arranged perpendicularly to the axes of the trunnions, an anti-friction thrust bearing permanently resting on said seat and interposed between said socket and the lower trunnion, an anti-friction thrust bearing interposed between said boss and the upper trunnion, a cap detachably secured to the housing and bearing upon the upper anti-friction bearing, shims arranged between the boss and said cap to permit adjustment of the bearings to take up wear, and shims arranged to determine the relation between the cap and upper trunnion.

3. Steering wheel drive mechanism for motor vehicles, comprising an axle housing, a male ball housing rigidly united with the axle housing and having external upwardly and downwardly projecting aligned trunnions, a movable female housing comprising two parts separably rigidly united on a plane transverse to the axis and together forming a cavity embracing the trunnion portion of the male ball, the outer member of said female housing having a wheel-carrying sleeve and the inner member of said female housing having a circular opening forming a grease seal with the external ball surface of the male housing, and said female housing having in its lower part a bearing-receiving pocket the bottom of which is integral with the housing and having in its upper part an open-ended bearing-receiving pocket accurately aligned with the lower pocket and normal to the bottom of said pocket, anti-friction bearings having races sleeved upon the trunnions and races seated in the pockets between the male and female housings, a closure for the open end of the open-ended pocket detachably secured to the female housing and holding the adjacent anti-friction bearing in position, a constant-velocity universal shaft joint mounted within the cavity formed by the male and female housings and positioned relative to the trunnion axis to be uniformly effective through the range of swing of the female housing, a drive shaft mounted in the axle housing and having an axially-separable, non-rotative association with the universal joint, a wheel journaled on the wheel-carrying sleeve, and an axially-separable non-rotative connection between said wheel and the universal joint.

4. In mechanism of the character described, a stationary housing having a hollow ball-shaped portion provided with diametrically opposite upwardly and downwardly projecting trunnions, a movable housing having a lower socket and an upper hollow boss into which said trunnions extend, said socket having an integral stationary seat arranged perpendicularly to the axes of the trunnions, an anti-friction thrust bearing permanently resting on said seat and interposed between said socket and the lower trunnion, an anti-friction thrust bearing interposed between said boss and the upper trunnion, a cap detachably secured to the housing and bearing upon the upper anti-friction bearing, shims arranged between the boss and said cap to permit adjustment of the bearings to take up wear, a wheel rotatably mounted on the movable housing and having its hub positioned in its entirety outwardly of said trunnions, the rim of the wheel being positioned in the plane of the axes of the trunnions, and means for driving the wheel from said shaft and including a constant velocity universal joint device positioned within said housings.

5. In mechanism of the character described, a stationary housing having a hollow ball-shaped portion provided with diametrically opposite upwardly and downwardly projecting trunnions, a movable housing having a lower socket and an upper hollow boss into which said trunnions extend, said boss having a bore extending entirely therethrough and said bore being of the same diameter as said socket, such socket having a stationary seat integral with the movable housing and arranged perpendicular to the axes of the trunnions, an anti-friction thrust bearing permanently resting on said seat and interposed between said socket and the lower trunnion, an anti-friction thrust bearing interposed between said boss and the upper trunnion, a cap detachably secured to the housing and bearing upon the upper anti-friction bearing, shims arranged between the boss and said cap to permit adjustment of the bearings to take up wear, and shims arranged to determine the relation between the cap and upper trunnion.

A. W. HERRINGTON.